United States Patent
Houbre et al.

(10) Patent No.: US 7,619,866 B2
(45) Date of Patent: Nov. 17, 2009

(54) ELECTRIC TRIP DEVICE PROVIDED WITH MONITORING MEANS, CIRCUIT BREAKER COMPRISING ONE SUCH TRIP DEVICE AND METHOD OF MONITORING

(75) Inventors: Pascal Houbre, Jarrie (FR); Patrick Perron, Moirans (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 512 days.

(21) Appl. No.: 11/516,591

(22) Filed: Sep. 7, 2006

(65) Prior Publication Data

US 2007/0063797 A1    Mar. 22, 2007

(30) Foreign Application Priority Data

Sep. 16, 2005    (FR) .................................. 05 09488

(51) Int. Cl.
*H02H 3/08*    (2006.01)
(52) U.S. Cl. ....................... 361/93.2; 361/93.6; 335/172
(58) Field of Classification Search ................ 361/93.2, 361/93.6; 335/172
See application file for complete search history.

(56) References Cited

U.S. PATENT DOCUMENTS 4,896,276 A * 1/1990 Saglimbeni et al. ......... 702/116
6,433,982 B1 * 8/2002 Santos ........................ 361/93.2
6,552,884 B2 * 4/2003 Kim et al. .................... 361/42

FOREIGN PATENT DOCUMENTS

| DE | 199 25 963 | | 12/2000 |
|----|------------|---|---------|
| EP | 0 785 610 | | 7/1997 |
| EP | 0785610 | * | 7/1997 |
| EP | 0 936 716 | | 8/1999 |
| EP | 0936716 | * | 8/1999 |
| EP | 1 467 460 | | 10/2004 |

* cited by examiner

*Primary Examiner*—Stephen W Jackson
*Assistant Examiner*—Terrence R Willoughby
(74) *Attorney, Agent, or Firm*—Steptoe & Johnson LLP

(57) ABSTRACT

The invention relates to an electronic trip device and a circuit breaker equipped with said electronic trip device, said trip device comprising at least one current sensor, an actuator, and an electronic processing unit to control said actuator, wherein the electronic processing unit comprises means for monitoring the state of connections of the at least one current sensor and/or of the actuator, and display means for displaying the operating state of the trip device, the means for monitoring acting on the display means to display the state of connections of the at least one current sensor and/or of the actuator. The invention also relates to a method for monitoring the state of connections of an electronic trip device comprising monitoring of the state of the connections and control of display of the state of the connections.

32 Claims, 6 Drawing Sheets

ELECTRIC TRIP DEVICE PROVIDED WITH MONITORING MEANS, CIRCUIT BREAKER COMPRISING ONE SUCH TRIP DEVICE AND METHOD OF MONITORING

BACKGROUND OF THE INVENTION

The invention relates to the field of circuit breakers, in particular to electronic trip devices equipping these circuit breakers.

The invention relates more particularly to an electronic trip device comprising:
- at least one current sensor to supply a signal representative of the intensity of a primary current in a main conductor,
- an actuator designed to actuate an opening mechanism of contacts in series with the main conductor, and
- an electronic processing unit to control said actuator according to values of said signal representative of the primary current intensity.

The invention in addition relates to a circuit breaker comprising:
- at least one main conductor,
- an opening mechanism of the main conductor, and
- an electronic trip device with at least one current sensor to provide a signal representative of the current intensity in the main conductor, an actuator and an electronic processing unit to control said actuator according to values of said signal representative of the primary current intensity.

The invention also relates to a method for monitoring the state of connections of an electronic trip device comprising:
- supply of a signal representative of the primary current intensity in a main conductor of the circuit breaker, by means of at least one current sensor,
- actuation of an opening mechanism of the main conductor by means of an actuator, and
- control of said actuator according to values of said signal representative of the primary current intensity.

STATE OF THE ART

Electronic processing units of prior art trip devices often comprise auxiliary functionalities to that of control of the actuator. For example, the electronic processing unit can include a functionality whereby information concerning the circumstances of tripping of the circuit breaker is indicated.

On account of their long lifetime in electrical installations and of their passive nature, circuit breakers generally have to be able to trip at any time, in reliable and reproducible manner. Reliability of circuit breakers is generally ensured by implementing stringent design and manufacturing constraints.

To ensure maximum safety, certain trip devices are designed to trip as soon as the slightest problem occurs. For example, European Patent application EP 0 244 284 describes an instantaneous trip device for a current limiting circuit breaker in which interruption of the circuit connecting the current sensor to the trip unit causes tripping of the circuit breaker. A direct current is input to the secondary winding of the current sensor to check the integrity of said sensor and of its connections. The disclosed circuit breaker also enables the cause of tripping to be detected.

Moreover, European Patent EP 0 785 610 describes a trip device provided with a monitoring device comprising test means to check the trip device. Operating phases dedicated to testing can be initiated by means of a program.

Known electronic trip devices generally ensure a good safety level. However, these trip devices do not enable their integrity and safety to be checked at the same time, and do not ensure a good availability, for example in the presence of faults.

SUMMARY OF THE INVENTION

It is one object of the invention to provide an electronic trip device having a high level of availability and safety.

The invention therefore relates to an electronic trip device comprising:
- at least one current sensor to provide a signal representative of the intensity of a primary current in a main conductor of said circuit breaker,
- an actuator designed to actuate an opening mechanism of contacts in series with the main conductor, and
- an electronic processing unit to control said actuator according to values of said signal representative of the primary current intensity, wherein the electronic processing unit comprises:
- means for monitoring the state of connections of the at least one current sensor and/or of the actuator, and
- display means for displaying the operating state of the trip device, the means for monitoring acting on the display means to display the state of said connections of the at least one current sensor and/or of the actuator, while maintaining processing to control the actuator according to values of said signal representative of the primary current intensity.

According to one embodiment of the invention, the means for monitoring the state of the connections of the at least one current sensor comprise test means provided with a current source designed to make a first test current flow in the current sensor, said current source being connected to said current sensor by means of a limiting resistor limiting the intensity of said first test current in such a way that, without disconnection of said current sensor, the first test current is superposed on the signal representative of the primary current intensity. Preferably, the current source comprises a voltage dividing bridge the mid-point whereof is connected to the limiting resistor, said mid-point supplying a source voltage.

Advantageously, the at least one current sensor supplies an input voltage signal such that:
- without disconnection of said current sensor, the input voltage signal is substantially equal to the product of a resistance of said current sensor and of the current representative of the primary current on which the first test current delivered by the current source is superposed, and
- in the event of disconnection of said current sensor, the input voltage signal is substantially equal to the source voltage of the current source.

According to one embodiment of the invention, the trip device comprises pre-processing means of the input voltage signal provided with filtering means, said pre-processing means being designed to supply a pre-processed signal to control means of the actuator on the one hand, and to control means of the display means on the other hand. Preferably, the pre-processing means further comprise an amplifier and a digital converter. Advantageously, the pre-processing means are connected to the control means of the actuator by means of processing means comprising:
- correction of the offset, and
- selection of the signals that have not changed sign during a predetermined period.

According to one embodiment of the invention, the electronic processing unit comprises monitoring means of faults of the trip device connected to the control means of the display means to display, in addition, the presence of trip device faults. Preferably, the faults are chosen from the following: abnormal temperature, incorrect operation of an integrated circuit, incorrect setting of the tripping thresholds, and/or abnormal voltage at the terminals of an electric power storage capacitor of the actuator.

According to one embodiment of the invention, the means for monitoring the state of the connections of the actuator act on the electric power supply of the display means to display the state of the actuator connections. Preferably, the means for monitoring the state of the connections of the actuator comprise a power supply designed to make a second test current flow in the actuator and through a current limiting resistor branch-connected with the control means of the actuator, the value of said resistance being chosen such as to limit the intensity of the second test current to a value lower than a tripping threshold of the actuator. The second test current is advantageously supplied by an electric power storage capacitor coupled with the actuator.

Preferably, the display means are arranged with respect to the means for monitoring the state of the actuator connections in such a way that said display means are supplied with electric power by the second test current only in the absence of disconnection of the actuator.

According to one embodiment of the invention, the display means comprise a light-emitting diode that is kept lit or flashing only in the absence of disconnection of the current sensors and/or of the actuator. Preferably, the light-emitting diode of the display means is kept lit or flashing only in the absence of disconnection of the current sensor(s) and/or of the actuator, and in the absence of a fault.

According to one embodiment, the trip device comprises a test connector. Advantageously, the test connector can be connected to a test box to check the state of the connections of the current sensor(s) and/or of the actuator and/or correct operation of the integrated circuit.

According to one embodiment, the trip device comprises communication means to translate the state of the connections of the at least one current sensor and/or of the actuator and/or of the trip device faults.

According to one embodiment, the trip device comprises processing means to control the actuator according to the state of the connections of the at least one current sensor and/or of the actuator and/or of the trip device faults.

The invention also relates to a circuit breaker comprising:
at least one main conductor,
an opening mechanism of the contacts in series with the main conductor, and
an electronic trip device with at least one current sensor to supply a signal representative of the current intensity in the main conductor, an actuator and an electronic processing unit to control said actuator according to values of said signal representative of the primary current intensity, wherein, said trip device is a trip device such as the one described above comprising display means representative of the state of connections of the at least one current sensor and/or of the actuator.

The invention also relates to a monitoring method for monitoring the state of connections of an electronic trip device comprising:

supply of a signal representative of the intensity of a primary current in a main conductor, by means of at least one current sensor,
actuation of a contact opening mechanism in series with the main conductor by means of an actuator, and
control of said actuator according to values of said signal representative of the primary current intensity.

The monitoring method according to the invention in addition comprises, while maintaining processing to control the actuator according to values of said signal representative of the primary current intensity:
monitoring of the state of the connections of the at least one current sensor and/or of the actuator, and
control of display of the state of the connections of the at least one current sensor and/or of the actuator.

According to one embodiment of the method, it comprises flow of a first test current in the current sensor that is superposed on the signal representative of the primary current intensity, when monitoring of the state of the connections of the at least one current sensor is performed.

Preferably, the method comprises supply of an input voltage signal, when monitoring of the state of the connections of the at least one current sensor is performed,
without disconnection of said current sensor, the input voltage signal being substantially equal to the product of a resistance of said current sensor and of the current representative of the primary current on which the first test current delivered by the current source is superposed, and
in case of disconnection of said current sensor, the input voltage signal being substantially equal to a source voltage of the current source.

According to one embodiment, the method comprises pre-processing of the input voltage signal, said pre-processing comprising a filtering step. Pre-processing of the input voltage signal preferably in addition comprises an amplification step and a digital conversion step of said signal. Advantageously, display control is performed from a pre-processed input voltage signal to display the state of the connections of the at least one current sensor.

According to one embodiment, the method comprises processing of the pre-processed input voltage signal so as to perform:
correction of the offset, and
selection of the signals that have not changed sign during a predetermined period.

According to one embodiment, the method comprises monitoring of trip device faults and display control to display, in addition, the state of the trip device faults. The trip device faults are preferably chosen from the following: abnormal temperature, incorrect operation of an integrated circuit, incorrect setting of the tripping thresholds, and/or abnormal voltage at the terminals of an electric power storage capacitor of the actuator.

According to one embodiment, the method comprises electric power supply of the display means only in the absence of disconnection of the actuator. Preferably, the method comprises flow of a second test current in the actuator and limiting of the intensity of said test current to a value lower than a tripping threshold of the actuator. The method advantageously comprises electric power supply of the display means by the second test current.

BRIEF DESCRIPTION OF THE FIGURES

Other advantages and features will become more clearly apparent from the following description of a particular embodiment of the invention, given for non-restrictive example purposes only, and represented in the accompanying figures.

DETAILED DESCRIPTION OF AN EMBODIMENT

Figure 1:
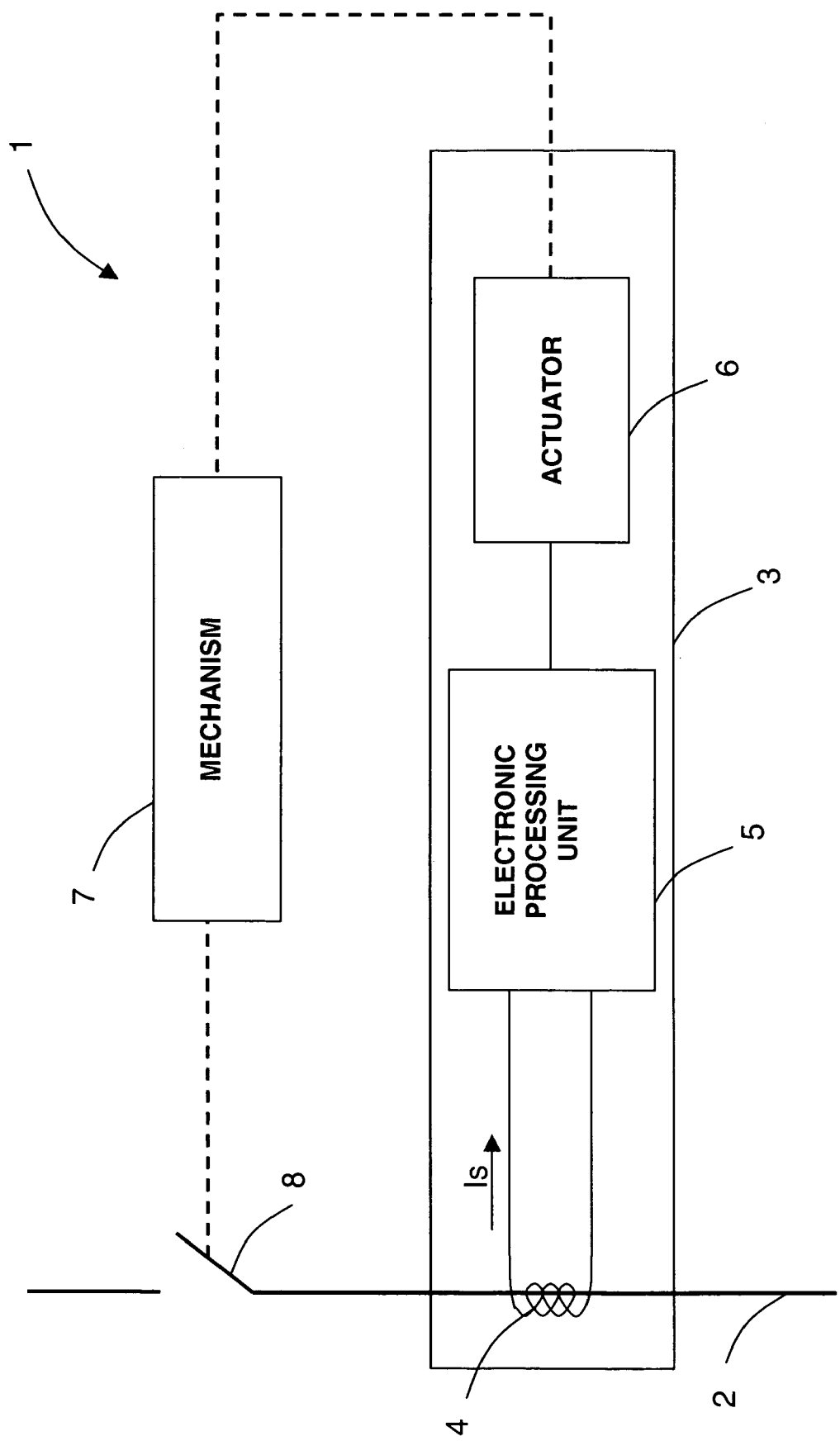
FIG. 1 represents a block diagram of the main components of a circuit breaker of known type.

The circuit breaker 1 represented in FIG. 1 comprises a main conductor 2 in series with a contact 8. In the case illustrated, the electric power system on which the circuit breaker is fitted only comprises one main conductor 2. The device of the invention also relates to protection of electric power systems comprising any number of conductors.

The circuit breaker 1 is equipped with a trip device 3 comprising a current sensor represented by a coil 4. The current sensor supplies a signal Is representative of the primary current intensity in the conductor with which it is associated.

The trip device 3 in addition comprises an electronic processing unit 5 designed to control an actuator 6 from the signal Is representative of the primary current intensity.

The actuator 6 enables the main conductor to be opened by means of a mechanism 7 acting on opening of the contact 8.

Figure 2:
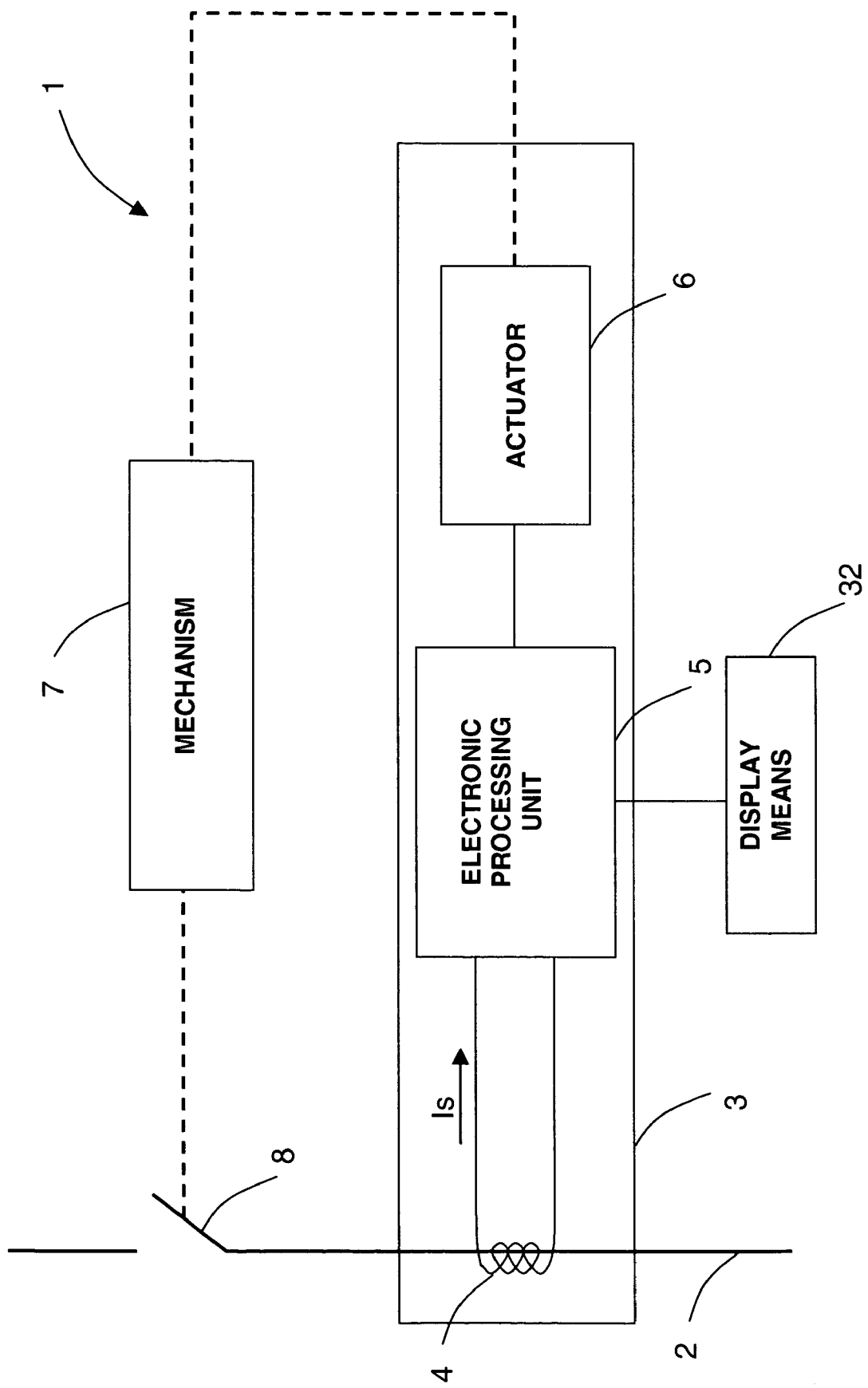
FIG. 2 represents a block diagram of the main components of a circuit breaker according to an embodiment of the invention.

The circuit breaker of FIG. 2 comprises all of the elements represented in FIG. 1. In addition, the circuit breaker represented comprises display means 32 enabling the state of connections of the at least one current sensor 4 and/or of the actuator to be displayed.

Figure 3:
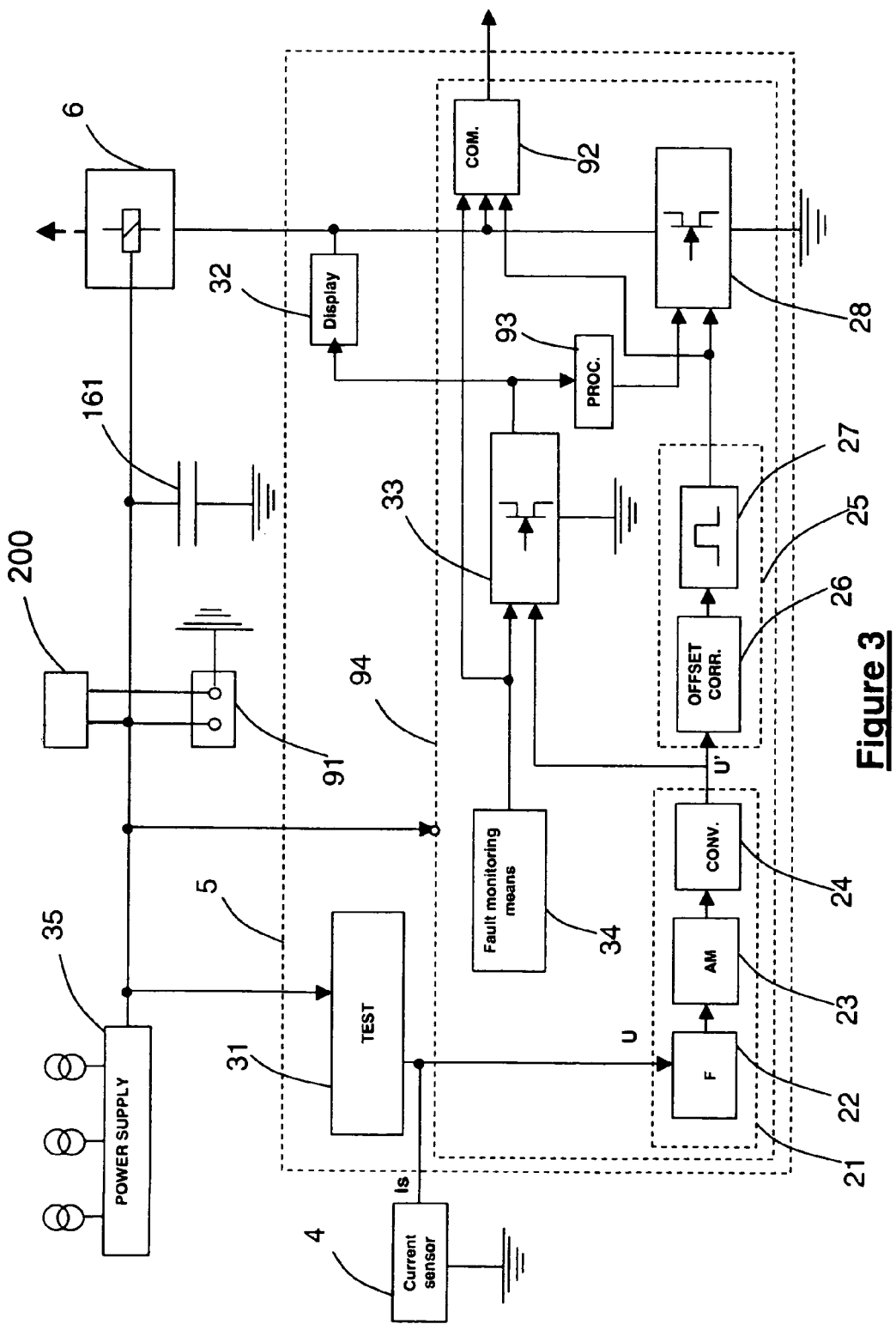
FIG. 3 represents a block diagram of an electronic trip device according to an embodiment of the invention

In the embodiment represented in FIG. 3, the trip device comprises a current sensor 4, an electronic processing unit 5 equipped with a processing circuit 94, and an actuator 6. The trip device in addition comprises pre-processing means 21 designed to process an input voltage signal U comprising a component linked to the signal Is representative of the primary current intensity in the main conductor with which the current sensor is associated. In the embodiment represented, the pre-processing means 21 comprise filtering means 22, an amplifier 23 and a converter 24 to convert the analog signal into a digital signal.

In the embodiment represented in FIG. 3, the pre-processing means supply a pre-processed signal U' to processing means 25 comprising an offset correction module 26 and a module 27 for selecting the signals that have not changed sign during a predetermined period. Offset correction consists in eliminating the DC component of the signal. The offset is often generated by the electronic components of the trip device. As explained further on, offset is also generated by the means for monitoring the state of the current sensor connections. As far as the module 27 for selecting the signals that have not changed sign during a predetermined period is concerned, use thereof prevents any nuisance tripping of the actuator in response to interference signals superposed on the signal representative of the primary current and having a larger amplitude than the lowest tripping threshold during a relatively short time. The pre-determined period is generally about a few milliseconds.

The signal thus processed is then sent to control means 28 of the actuator 6 the main function whereof is to supply a tripping order to the actuator in response to a signal Is corresponding to a primary current intensity exceeding at least a tripping threshold of the circuit breaker. The control means 28 can comprise a certain number of control modules in parallel, each of these modules being configured to trip at different primary current intensity thresholds and/or with different response times. The process of these control modules is represented in more detailed manner in FIG. 5. What is meant by response time is the threshold overshoot time beyond which the actuator is actuated. Thus, the actuator control means can for example comprise a control module of the Selective-limiting instantaneous type, i.e. with almost instantaneous response times, a short delay control module for short-circuit protection, and a long delay control module for overload protection. In addition, the actuator control means can comprise an earth leakage control module, i.e. a module supplying a tripping order in the event of an earth leakage current occurring.

The trip device represented in FIG. 3 comprises means for monitoring the state of the connections of the current sensor equipped with test means 31, display means 32 for displaying the operating state of the trip device, and control means 33 of the display means. The test means 31 act on the display means 32 to display the state of the connections of each current sensor. This action is performed by means of the pre-processing means 21 and the control means 33, the signal U' supplied by the pre-processing means 21 from an input voltage signal U from the current sensor being sent to said control means 33. In the embodiment represented in FIG. 3, the means for monitoring the state of the current sensor connections comprise the test means 31 and the pre-processing means 21 supplying a pre-processed signal U' enabling the control means 33 to command display of the state of the connections of said current sensor. The pre-processed signal U' is used to act both on the display means 32 in the event of disconnection of the current sensor, and on the control means 28 of the actuator 6 in case the primary current intensity was to exceed at least one tripping threshold. Thus, the means for monitoring the state of the current sensor connections act on the display means while maintaining processing to control the actuator 6 according to values of the signal Is representative of the primary current intensity, i.e. without impairing the ability of the trip device to detect a primary current surge to command opening of the contacts 8 of the main conductor 2 by means of the actuator 6.

Figure 4:
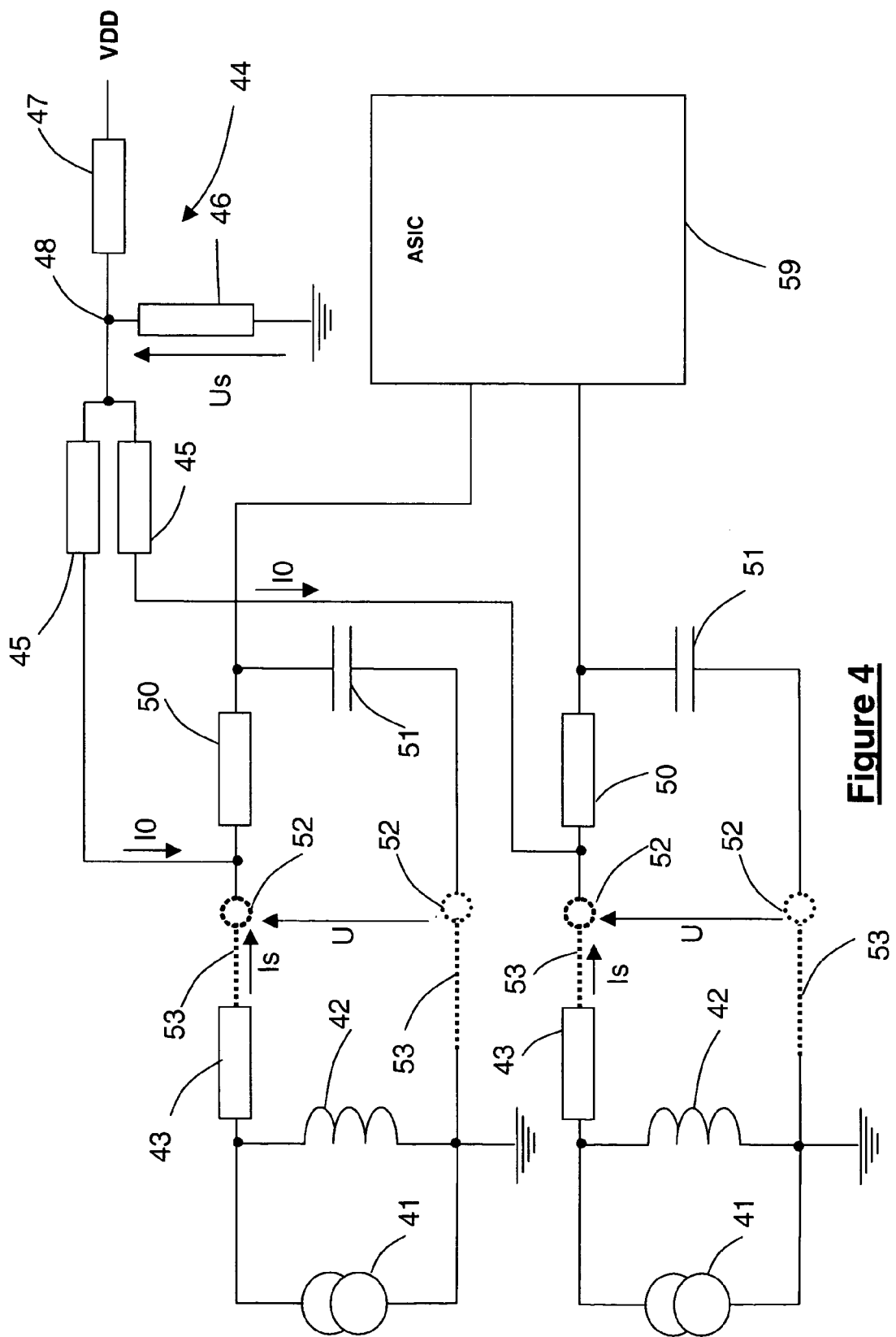
FIG. 4 represents an embodiment of the means for monitoring the state of connections of a current sensor and of the filtering means associated with two current sensors corresponding to the main conductors of the circuit breaker.

In the embodiment represented in FIG. 4, the current sensors are schematically represented by a current source 41 connected in parallel with an inductance coil 42 and in series with a resistor 43 corresponding to the resistance of the coil, the value of which resistance is low with respect to whole of the circuit. The current sensors can be of the air type or be Rogowski coils. The means for monitoring the state of the connections of each current sensor comprise test means equipped with a current source 44 designed to make a first test current I0 flow in each current sensor, said current source being connected to each of the current sensors by means of resistors 45 limiting the intensity of said first test current I0 so that, in the absence of disconnection of said current sensor, the first test current I0 is superposed on the signal Is representative of the primary current intensity. The value of the resistors 45 is generally high, which enables the intensity of the first test current in the coil to be limited. The first test current I0 can be DC, low-frequency or very low-frequency.

The test means therefore comprise a current source 44, represented in FIG. 4 by a voltage source VDD and a voltage dividing bridge comprising two resistors 46 and 47 connected in series between earth and the voltage source VDD. The source voltage Us at the mid-point 48 of the dividing bridge, situated between the two resistors 46 and 47, enables the first test current I0 to be made to flow in each coil of the current sensors, from said mid-point 48. This mid-point 48 thus forms the current input point of the current source 44. The first test current I0 thus flows in each current sensor and is superposed on the current Is representative of the primary current.

The zone of each current sensor that is able to be disconnected is represented, in FIG. 4, by contacts 52 and a conductor 53, both in dotted lines.

As represented in FIG. 3, the input voltage signal U at the terminals of each current sensor is supplied by means of the pre-processing means 21 to the control means of the display means 33. The pre-processing means 21 comprise a filtering module 22 represented in FIG. 4 by a resistor 50 and a capacitor 51 associated with each current sensor. The amplifier and the converter of the pre-processing means are not specifically represented in FIG. 4 and form part of a custom integrated circuit 59.

Without disconnection of each current sensor, the input voltage signal U is substantially equal to the product of the resistance 43 of said current sensor and of the current Is representative of the primary current on which the first test current I0 delivered by the current source is superposed. The first test current I0 is generally negligible in comparison with the current Is representative of the primary current. In normal operation, this first test current I0 constitutes an offset that can be corrected by the offset correction module 26 of the processing means 25.

In case of disconnection of a current sensor, the input voltage signal U is substantially equal to the source voltage Us of the current generator.

Figure 5:
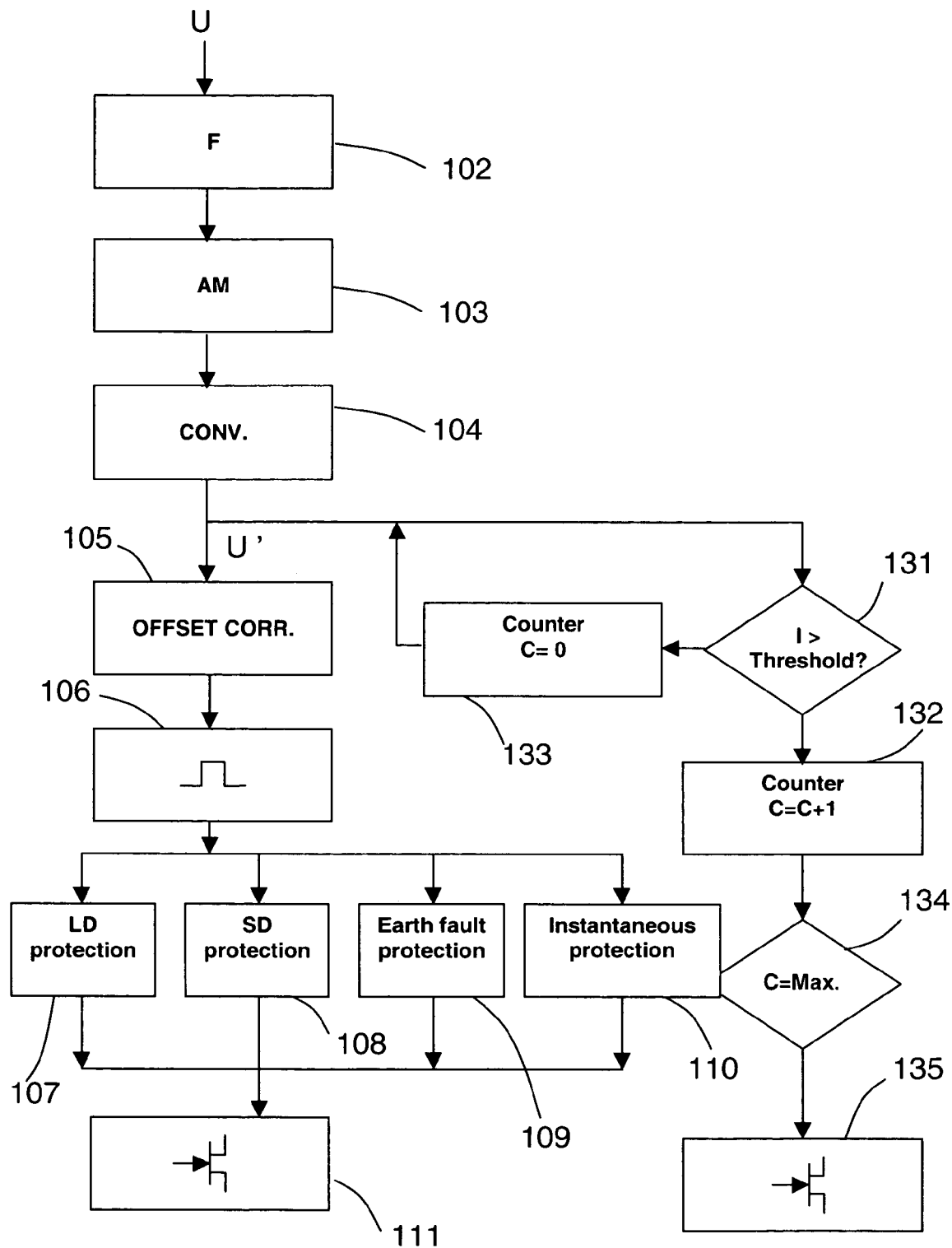
FIG. 5 represents a block diagram illustrating pre-processing of an input voltage signal coming from a current sensor and monitoring means of the state of connections of said current sensor, and processing of said signal up to control of the actuator and of the display means.

The block diagram of FIG. 5 illustrates, in more detailed manner, pre-processing of the input voltage signal U coming from each current sensor, processing of said pre-processed signal U', and control of the actuator and of the display means.

The input voltage signal U is filtered in a step 102, and amplified in a step 103 before being digitally converted in a step 104. The input voltage signal U, in the absence of disconnection of a current sensor, comprises a component linked to the current Is representative of the primary current and a component linked to the first test current I0 of the monitoring means.

This pre-processed signal U' of the input voltage U is then processed on two distinct and independent channels, the first channel being designed to control the actuator and the second channel being designed to control the display means. Thus, the means for monitoring the state of the current sensor connections act on the display means while maintaining processing to control the actuator according to values of the signal representative of the primary current intensity, i.e. without impairing the ability of the trip device to detect a primary current surge to command opening of the contacts of the main conductor.

As far as the first channel represented in the left-hand part of the block diagram of FIG. 5 is concerned, the filtered, amplified and digitized input voltage signal U undergoes a first offset correction processing step 105. The offset is partly generated by the electronic components of the circuit. Moreover, the component of the input voltage signal U linked to the first test current I0 also provides a contribution to the offset. Without disconnection of the current sensor, the pre-processed signal U' that has undergone offset correction now only comprises a single component linked to the current Is representative of the primary current intensity. The pre-processed signal U' corrected by the offset is then processed to select signals that have not changed sign during a predetermined period in a step 106 often known under the name of "anti-drag" step. As described before, such a processing enables any nuisance instantaneous tripping of the actuator in response to a superposition of stray signals of high amplitudes on the electrical information to be prevented. The input voltage signal U thus pre-processed and processed is then sent to several control modules 107, 108, 109, and 110 configured to trip at different primary current intensity thresholds and/or with different response times. These control modules are arranged to supply information to a control interface 111 designed to control the actuator.

As far as the second channel represented in the right-hand part of the block diagram of FIG. 5 is concerned, the pre-processed signal U', i.e. the filtered, amplified and digitized input voltage signal U, presents a component linked to the first test current I0, a component linked to the current Is representative of the primary current and an offset generated by the electronic components of the circuit. The value of the intensity of the first test current I0 is advantageously chosen such that the component of the input voltage signal U linked to the first test current I0 can be differentiated from the offset generated by the electronic components of the trip device. Preferably, the value of the intensity of the first test current I0 is chosen such that the component of the input voltage signal U linked to the first test current I0 is significantly greater than the offset generated by the electronic components of the trip device. Moreover, the value of the voltage Us is preferably chosen such that the filtered, amplified and digitized voltage Us is lower than an input voltage signal U corresponding to flow of a current equal to the lowest instantaneous tripping threshold of the circuit breaker. The pre-processed signal U', i.e. the filtered, amplified and digitized input voltage signal U, is sent to a comparator 131 to compare said pre-processed signal with a display threshold. The display threshold is chosen lower than the filtered, amplified and digitized source voltage Us from which the value of the offset generated by the electronic components is subtracted. In the case of disconnection of a current sensor, the input voltage signal U is substantially equal to the source voltage Us, and the corresponding pre-processed signal U' is greater than the display threshold. In this case, a counter is incremented 132, otherwise this counter is reset to zero 133. Once the counter has been incremented 134, the value of the counter is compared with a predetermined value corresponding to a minimum duration to eliminate stray signals. So long as the value of the counter is below the predetermined value, the process is reiterated in the comparison step 131. Once the predetermined value has been exceeded, display of the presence of a disconnection of a current sensor is commanded 135.

The electronic processing unit of FIG. 3 in addition comprises trip device fault monitoring means 34 connected to the control means of the display means enabling the presence of faults in the trip device to be displayed in addition. These faults are chosen from the following: abnormal temperature, incorrect operation of an integrated circuit, incorrect setting of the tripping thresholds, and/or abnormal voltage at the terminals of an electric power storage capacitor of the actuator.

The trip device fault monitoring means can be connected to the control means of the display means in such a way as to control display of the presence of a fault in general, i.e. including any disconnection of a current sensor.

The electronic processing unit can in addition comprise means for monitoring the state of the actuator connections acting on the electric power supply of the display means to display the state of the actuator connections. FIG. 3 represents the electric power supply means 35 supplying power to the test means 31, the actuator 6 and the display means 32 via said actuator. The electric power supply means 35 in addition charge an electric power storage capacitor 161 associated with the actuator. The actuator 6 and the display means are both connected in series. The electric power storage capacitor 161 thus forms part of the means for monitoring the state of the actuator connections acting on the electric power supply of the display means. Any disconnection of the actuator would in fact result in the electric power supply of the display means being lost.

Figure 6:
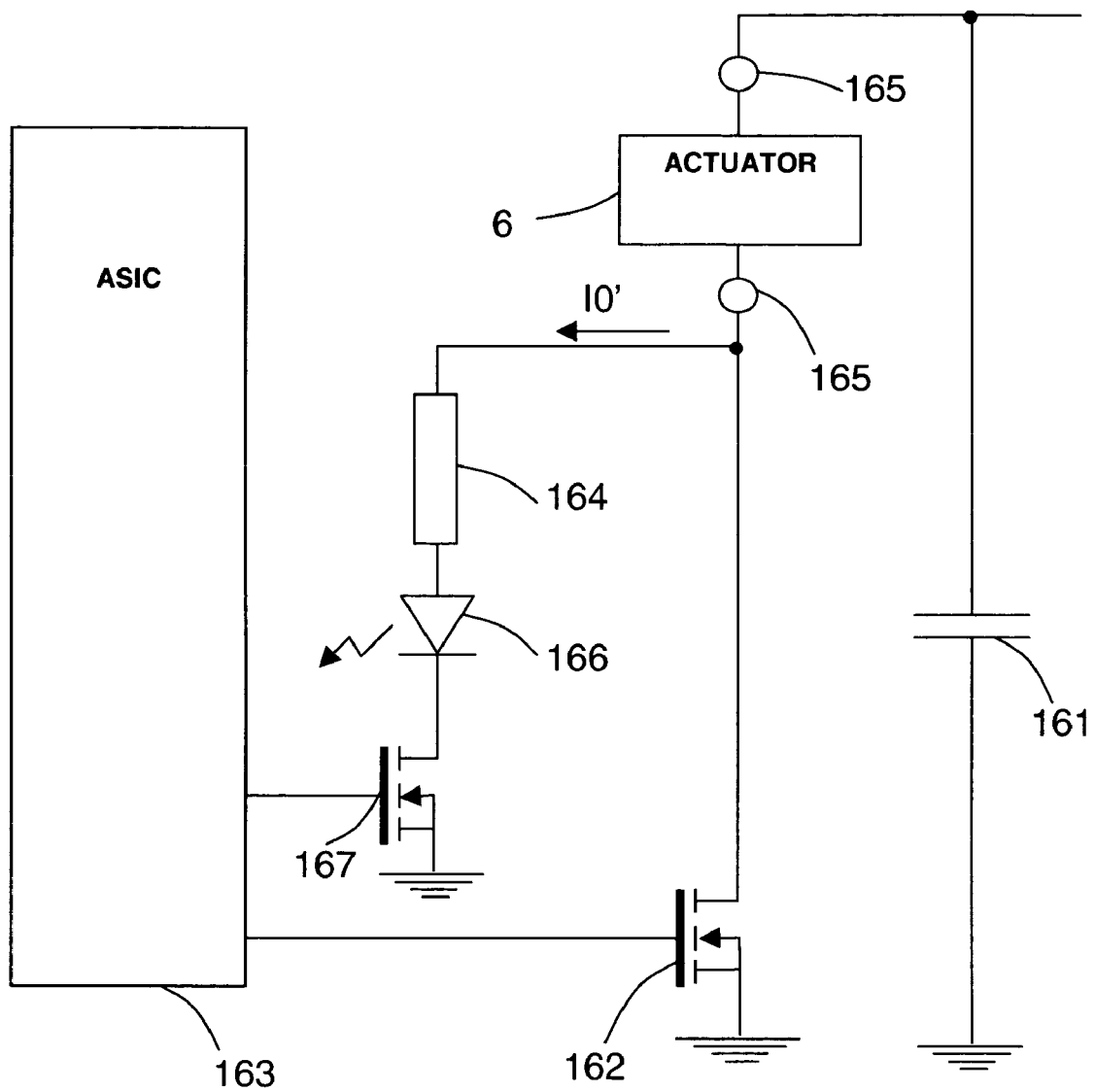
FIG. 6 represents a part of a trip device on the actuator side comprising, among others, the means for monitoring the state of connections of the actuator and the display means.

FIG. 6 represents means for monitoring the state of the actuator connections. The actuator 6 is coupled with an electric power storage capacitor 161 enabling said actuator to be kept continuously supplied with power. Tripping of the actuator is achieved by a tripping order supplied by a control transistor 162, said transistor forming part of the control means of the actuator 28 represented in FIG. 3. The up-line part of the control means of the actuator 28, in particular the control modules corresponding to the different tripping thresholds, is not specifically represented in FIG. 6, but is clearly illustrated in FIG. 5. This up-line part is comprised, in the embodiment represented in FIG. 6, in a specific integrated circuit 163. When tripping of the actuator 6 takes place, the control transistor 162 closes the circuit in series with the actuator so as to make a current flow through the latter by discharging the capacitor 161.

In the embodiment represented in FIG. 6, the means for monitoring the state of the actuator connections comprise a power supply, in this instance the electric power storage capacitor 161 of the actuator, designed to make a second test current I0' flow in the actuator and through a current limiting resistor 164 branch-connected with the control means 162 of the actuator, the value of said resistor being chosen such as to limit the intensity of the second test current I0' to a value lower than a tripping threshold of the actuator. In this way, the means for monitoring the state of the actuator connections act on the display means while maintaining processing to command the actuator 6 according to values of the signal Is representative of the primary current intensity, i.e. without impairing the ability of the trip device to detect a primary current surge and to command opening of the main conductor contacts by means of the actuator 6.

The actuator is connected in the trip device by contacts 165. Disconnections of the actuator generally take place at the level of these contacts. The display means, in this instance a light-emitting diode 166, are arranged with respect to the means for monitoring the state of the actuator connections, in this instance the capacitor 161 and resistor 164, in such a way that said display means are supplied with electric power by the second test current I0' only in the absence of disconnection of the actuator. In this way, in the absence of disconnection of the actuator, the light-emitting diode 166 is kept lit by the electric power source constituted by the electric power storage capacitor 161 of the actuator. The current limiting performed by the resistor 164 means that a display can be performed not influencing tripping of the actuator. Should a disconnection occur, the light-emitting diode 166 is no longer supplied with power.

FIG. 6 also represents connection of the display means 166 with a control transistor 167 belonging to the control means 33 represented in FIG. 3. Should a disconnection of a current sensor or a trip device fault occur, the controlled switch formed by the transistor 167 opens preventing any current flow in the display module.

Thus, in the case represented in FIGS. 3 and 6, the display means 32, 166 are only supplied when no disconnection is detected. The unlit state of the display means will draw the user's attention to the fact that a fault or a disconnection exists, and that action has to be taken to eliminate this fault or disconnection.

The trip device represented in FIG. 3 comprises a test connector 91. A test box can be connected to the test connector to check the state of the connections of the sensor(s) and/or of the actuator and/or correct operation of the integrated circuit. When the electronic trip device is no longer supplied by the electric power supply means 35 of the trip device or of the electric circuit in which it is connected, the test connector 91 can also enable the circuit breaker to be supplied with electric power by external power supply means, such as a test box 200. In this way, the state of the connections of the at least one current sensor and/or of the actuator and/or of the trip device faults can be tested, when the electric power supply means 35 are no longer supplying power to the trip device, for example in off-line tests.

The trip device represented in FIG. 3 comprises communication means 92 to translate the state of the connections of the at least one current sensor and/or of the actuator and/or of the trip device faults.

The trip device can comprise processing means 93 enabling the actuator to be controlled according to the state of the connections of the at least one current sensor and/or of the actuator and/or of the trip device faults. Thus, these means enable opening of a main conductor of the circuit breaker to be commanded in response to a disconnection or a fault.

The display means, in this instance the light-emitting diode 166, can also be associated with other annunciation functions, such as for example detection of a tripping threshold overshoot. These other annunciation functions can be cumulated or exclusive.

The indication mode of these other annunciation functions can be a different lighting state of the display means, such as for example flashing of the display means. In the same way, extinction of the display means, for example of the diode 166, enables the existence of a fault or of a disconnection to be indicated.

The electronic trip device can be in a circuit breaker or in an indication and tripping relay outside the circuit breaker. It can be designed for control of a contactor or of a relay.

The actuator can for example be an electromagnetic relay or any other type of relay.

One advantage of the electronic trip device of the invention is that it is provided with display means that do not impair the prime function of said trip device on the channels that are not malfunctioning, i.e. its ability to detect a primary current surge in a main conductor of the circuit breaker, to command opening of said conductor by means of the actuator.

Another advantage of the electronic trip device is that the display means are configured on the one hand to indicate the presence of least one disconnection, and on the other hand to automatically re-establish display representative of the correct operating state thereof following any operation having the purpose of re-establishing the connection.

The invention claimed is:

1. Electronic trip device comprising:
   at least one current sensor to supply a signal representative of an intensity of a primary current in a main conductor,
   an actuator for actuating an opening mechanism of contacts in series with the main conductor, and
   an electronic processing unit to control said actuator according to values of said signal representative of the primary current intensity,
   wherein the electronic processing unit comprises:
      means for monitoring the state of connections of each of the current sensor and the actuator, such that the means for monitoring are able to monitor a state of the current sensor independently of the state of the actuator, and
      display means for displaying the operating state of the trip device, the means for monitoring acting on the display means to display the state of said connections of at least one of the current sensor and the actuator, while maintaining processing to control the actuator according to values of said signal representative of the primary current intensity.

2. An electronic trip device according to claim 1, wherein the means for monitoring the state of connections of the at least one current sensor comprise test means having a current source for making a first test current flow in the current sensor, said current source being connected to said current sensor by means of a limiting resistor limiting the intensity of said first test current in such a way that, without disconnection of said current sensor, the first test current is superposed on the signal representative of the primary current intensity.

3. An electronic trip device comprising:
   at least one current sensor for supplying a signal representative of an intensity of a primary current in a main conductor,
   an actuator for actuating an opening mechanism of contacts in series with the main conductor, and
   an electronic processing unit to control said actuator according to values of said signal representative of the primary current intensity,
   wherein the electronic processing unit comprises:
      means for monitoring the state of connections of at least one of the current sensor and the actuator, and
      display means for displaying the operating state of the trip device, the means for monitoring acting on the display means to display the state of said connections of at least one of the current sensor and the actuator, while maintaining processing to control the actuator according to values of said signal representative of the primary current intensity,
   wherein the means for monitoring the state of connections of the at least one current sensor comprise test means having a current source for making a first test current flow in the current sensor, said current source being connected to said current sensor by means of a limiting resistor limiting the intensity of said first test current in such a way that, without disconnection of said current sensor, the first test current is superposed on the signal representative of the primary current intensity, and
   wherein the current source comprises a voltage dividing bridge having a mid-point connected to the limiting resistor, said mid-point supplying a source voltage.

4. A trip device according to claim 3, wherein the at least one current sensor supplies an input voltage signal, such that, without disconnection of said current sensor, the input voltage signal is substantially equal to the product of a resistance of said current sensor and of the current representative of the primary current on which the first test current delivered by the current source is superposed, and in case of disconnection of said current sensor, the input voltage signal is substantially equal to the source voltage of the current source.

5. A trip device according to claim 4, wherein said trip device comprises pre-processing means of the input voltage signal having filtering means, said pre-processing means being designed to supply a pre-processed signal to control means of the actuator on the one hand, and to control means of the display means on the other hand.

6. A trip device according to claim 5, wherein the pre-processing means further comprise an amplifier and a digital converter.

7. A trip device according to claim 5, wherein the pre-processing means are connected to the control means of the actuator by means of processing means comprising: correction of the offset, and selection of the signals that have not changed sign during a predetermined period.

8. A trip device according to claim 1, wherein the electronic processing unit comprises trip device fault monitoring means connected to the control means of the display means to display the presence of faults in the trip device.

9. A trip device according to claim 8, wherein the faults are chosen from the following: abnormal temperature, incorrect operation of an integrated circuit, incorrect setting of tripping thresholds, and abnormal voltage at the terminals of an electric power storage capacitor of the actuator.

10. A trip device according to claim 1, wherein the means for monitoring the state of the actuator connections act on an electric power supply of the display means to display the state of the actuator connections.

11. A trip device according to claim 10, wherein the means for monitoring the state of the actuator connections comprise a power supply for making a second test current flow in the actuator and through a current limiting resistor branch-connected with the actuator control means, the value of said resistance being chosen such as to limit the intensity of the second test current to a value lower than a tripping threshold of the actuator.

12. A trip device according to claim 11, wherein the second test current is supplied by an electric power storage capacitor coupled with the actuator.

13. A trip device according to claim 11, wherein the display means are arranged with respect to the means for monitoring the state of the actuator connections in such a way that said display means are supplied with electric power by the second test current only in the absence of disconnection of the actuator.

14. A trip device according to claim 1, wherein the display means comprise a light-emitting diode that is kept lit or flashing only in the absence of disconnection of at least one of the current sensor and the actuator.

15. A trip device according to claim 14, wherein the light-emitting diode of the display means is kept lit or flashing only in the absence of disconnection of the at least one of current sensor and the actuator, and in the absence of a fault.

16. A trip device according to claim 1, comprising a test connector.

17. A trip device according to claim 16, wherein the test connector is connected to a test box for checking the state of the connections of at least one of the current sensor, the actuators and correct operation of the electronic processing unit.

18. A trip device according to claim 1, comprising communication means to translate the state of the connections of at least one of the current sensor, the actuator, and the trip device faults.

19. A trip device according to claim 1, comprising processing means for controlling the actuator according to the state of the connections of at least one of current sensor, the actuator, and the trip device faults.

20. A circuit breaker comprising:
at least one main conductor,
an opening mechanism of contacts in series with the main conductor, and
an electronic trip device with at least one current sensor for supplying a signal representative of the current intensity in the main conductor,
an actuator and an electronic processing unit to control said actuator according to values of said signal representative of the primary current intensity,
wherein the electronic trip device is a trip device according to claim 1 comprising display means representative of the state of connections of at least one of the current sensor and of the actuator.

21. A method for monitoring the state of connections of an electronic trip device comprising:
supplying a signal representative of the intensity of a primary current in a main conductor by means of at least one current sensor,
actuating an opening mechanism of contacts in series with the main conductor by means of an actuator, and
controlling said actuator according to values of said signal representative of the primary current intensity,
while maintaining processing to control the actuator according to values of said signal representative of the primary current intensity:
monitoring the state of the connections of the actuator and a current level of the current sensor, the state of connections of the actuator being monitored independent of the current level of the current sensor, and
displaying the state of the connections of at least one of the current sensor and the actuator.

22. A method according to claim 21, wherein, when monitoring of the state of the connections of the at least one current sensor is performed, it comprises flow of a first test current in the current sensor that is superposed on the signal representative of the primary current intensity.

23. A method according to claim 21, wherein, when monitoring of the state of the connections of the at least one current sensor is performed, it comprises supplying an input voltage signal, without disconnecting said current sensor, the input voltage signal being substantially equal to the product of a resistance of said current sensor and of the current representative of the primary current on which the first test current delivered by the current source is superposed, and when said current sensor is disconnected, the input voltage signal is substantially equal to a source voltage of the current source.

24. A method according to claim 23, comprising pre-processing of the input voltage signal, said pre-processing comprising a filtering step.

25. A method according to claim 24, wherein pre-processing of the input voltage signal in addition comprises an amplification step and a digital conversion step of said signal.

26. A method according to claim 23, wherein display control is performed from a pre-processed input voltage signal to display the state of the connections of the at least one current sensor.

27. A method according to claim 23, comprising processing of the pre-processed input voltage signal, said processing comprising:
correcting an offset, and
selecting an input voltage signal that has not changed sign during a predetermined period.

28. A method according to claim 23, comprising monitoring of trip device faults and the display control to further display the state of the trip device faults.

29. A method according to claim 28, wherein the trip device faults are chosen from the following: abnormal temperature, incorrect operation of an integrated circuit, incorrect setting of tripping thresholds, and abnormal voltage at terminals of an electric power storage capacitor of the actuator.

30. A method according to claim 21, comprising electric power supply of the display means only when the actuator is connected.

31. A method according to claim 30, comprising flow of a second test current in the actuator and limiting of the intensity of said second test current to a value lower than a tripping threshold of the actuator.

32. A method according to claim 31, comprising electric power supply of the display means by the second test current.

* * * * *